United States Patent [19]

Belleville et al.

[11] Patent Number: 4,863,654
[45] Date of Patent: Sep. 5, 1989

[54] METHOD FOR MAKING FOAMED ARTICLES

[75] Inventors: Ernest L. Belleville, Barrington, N.H.; Patricia A. Betzig, Gainsville, Fla.

[73] Assignee: Davidson Textron Inc., Dover, N.H.

[21] Appl. No.: 177,329

[22] Filed: Apr. 4, 1988

Related U.S. Application Data

[62] Division of Ser. No. 108,422, Oct. 14, 1987, Pat. No. 4,793,784.

[51] Int. Cl.⁴ .............................................. B29C 53/40
[52] U.S. Cl. .................................. 264/46.6; 264/46.7; 264/46.8
[58] Field of Search ................... 264/46.6, 46.7, 46.8

[56] References Cited

U.S. PATENT DOCUMENTS 3,890,415  6/1975  Hull ..................................... 264/46.7
4,501,541  2/1985  Bethell et al. ..................... 264/46.8

FOREIGN PATENT DOCUMENTS 57-115328  7/1982  Japan ................................. 264/46.7
61-162308  7/1986  Japan ................................. 264/46.4

Primary Examiner—Jan H. Silbaugh
Assistant Examiner—Allan R. Kuhns
Attorney, Agent, or Firm—Reising, Ethington, Barnard, Perry & Milton

[57] ABSTRACT

The apparatus includes a first female mold member defining a shaped mold cavity for receiving a plastisol layer or skin. A second mold member is pivotally disposed on the female mold member between an open and closed position. In the open position, the second mold member receives and holds thereon a portion of the plastisol skin extending from the mold cavity. An insert is positioned in the mold cavity by a third mold member such as a mold lid on which the insert is releasably retained. After the insert is positioned in the mold cavity, the second mold member is pivoted toward the mold lid to fold the skin portion thereon over and against an edge of the insert. The skin is folded adjacent the pivot axis of the second mold member. Foam can then be introduced and cured between the skin and insert.

5 Claims, 3 Drawing Sheets 4,863,654

METHOD FOR MAKING FOAMED ARTICLES

This a division of application Ser. No. 108,422, filed on Oct. 14, 1987, now U.S. Pat. No. 4,793,784.

FIELD OF THE INVENTION

The invention relates to an apparatus and method for producing molded foam articles and, in particular, molded articles having an intermediate foam component between outer foam impermeable layers, especially where one of the outer layers is a decorative skin and the other is a rigid support insert and especially where the skin is wrapped over at least a portion of the insert.

BACKGROUND OF THE INVENTION

Molded foam articles having a foam layer such as polyurethane foam between an outer thin decorative plastisol skin and rigid plastic insert have been widely used in the field of interior automobile components such as crash pads, cushions, arm rests and the like.

In the prior art process for making such molded foam articles, a properly shaped mold cavity is lined with the thin plastisol skin, liquid polyurethane is poured onto the skin and the rigid insert is placed into position in the mold cavity spaced above the thin plastisol skin to leave a space therebetween for the liquid polyurethane to foam in situ therebetween when the mold is heated. Typically, the rigid insert is releasably carried on a mold lid which is moved into mating relation with the mold member defining the mold cavity. In the past, the plastisol skin is hand wrapped over the exposed edge of the rigid insert after it is inserted to close off the space therebetween to prevent foam egress. Hand wrapping of the plastisol skin over the exposed edge of the insert is time consuming and sometimes inconsistent such that foam escapes between the skin and insert edge resulting in a lower quality molded foam article.

The Nakashima U.S. Pat. No. 4,420,447 issued Dec. 13, 1983, discloses a process for raking molded foam articles of the type described wherein the rigid insert is provided with a thin film on the side facing the thin plastisol skin in the mold cavity and wherein an edge or skirt portion of this film is pinched together with the edge or skirt portion of the plastisol skin between the mated mold members to reduce escape of foam and reduction in foam burr defects on the molded article.

The Melchert U.S. Pat. No. 4,544,126 issued Oct. 1, 1985, illustrates a dual lid foam molding apparatus for conducting a two-stage foam molding process to incorporate a frame member in the molded article. Each lid is alternately engaged on a female mold to carry out the two step foam molding process.

The Simpson U.S. Pat. No. 4,406,848 issued Sept. 27, 1983, discloses a mold assembly for making foamed articles wherein the assembly includes hingedly mounted wing members that cooperate with an insert in the closed position to foam a mold cavity.

The Wolf U.S. Pat. No. 4,336,009 issued June 22, 1982, illustrates use of knife-edge type sealing surfaces on upper and lower mold members to indent and seal against an article to prevent rubber material from escaping from the mold cavity.

SUMMARY OF THE INVENTION

The invention contemplates an apparatus for forming a molded foam article and including multiple mold members, one of which is adapted to receive a portion of the plastisol or other layer extending from the mold cavity and to fold the portion of the layer onto the insert positioned in the mold cavity.

In a typical embodiment of the invention, the apparatus includes a first mold member having a first surface defining a mold cavity for receiving the plastisol layer of skin thereon with a portion of the skin extending from the mold cavity. A second mold member includes a second surface generally contiguous with the first surface of the first mold member when the former is in the open position. The second surface receives thereon the portion of the skin extending from the mold cavity. A third mold member is provided for positioning an insert in spaced relation to the skin in the mold cavity when the second mold member is in the open position. The insert is positioned with a peripheral edge facing the mold lid. After the insert is positioned, the second molded member is movable from the open position to a closed position between the first mold member and third mold member to fold the portion of skin thereon onto the peripheral edge of insert and between the first mold member and third mold member.

In a preferred embodiment of the second mold member is pivotally or hingedly mounted on the first mold member for pivotal movement toward the third mold member about a pivot axis adjacent the first mold member. When the second mold member is pivoted toward the third mold member, the skin is folded adjacent the pivot axis while the skin is held or retained on the first and second mold members. Preferably, actuator means is provided to pivot the second mold member to the closed position after insertion of the insert. The actuator means can be controlled automatically by the control unit of the molding apparatus.

In another preferred embodiment of the invention, the portion of the skin received on the second mold member is held or retained thereon by means for creating a differential pressure on opposite sides of the skin.

The invention also contemplates a method for making a molded foam article involving the steps of holding the portion of the plastisol or other skin extending from the mold cavity on a movable member, moving the member to a closed position toward an insert positioned in the mold cavity to fold the portion of skin over and against the insert and forming foam between the skin and insert while the movable member is in the closed position.

BEST MODE FOR PRACTICING THE INVENTION

Figure 1:
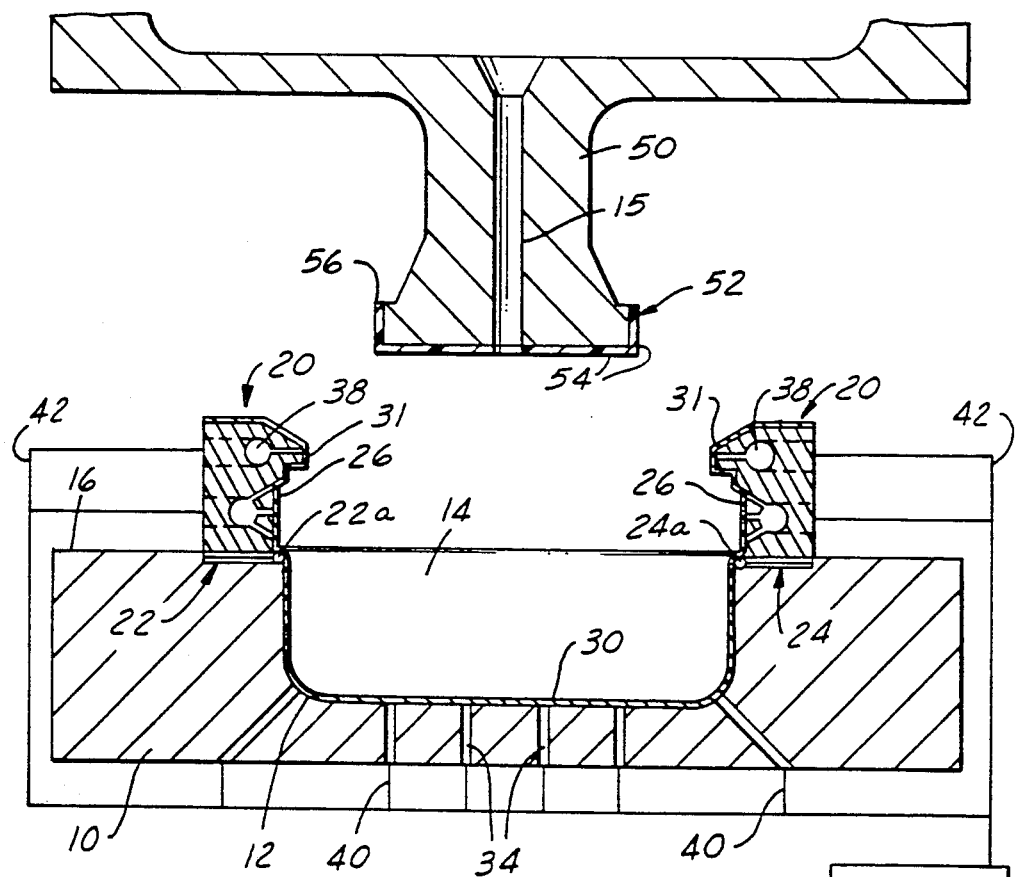
FIG. 1 is a sectional view of the molding apparatus of the invention showing the first female mold member with second mold members thereon in an open position and a third mold member or lid ready for placing the insert in the mold cavity.
Figure 2:
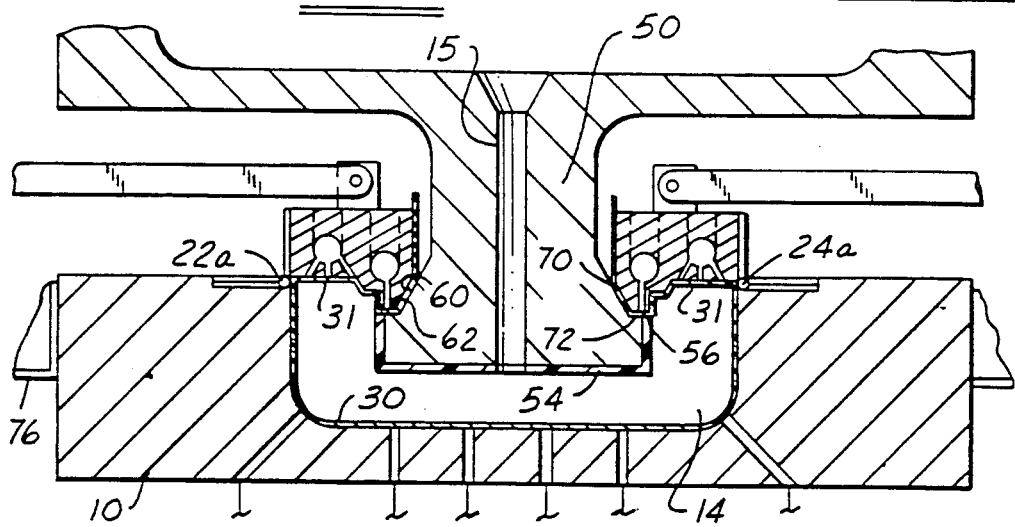
FIG. 2 is similar to FIG. 1 but with the insert positioned in the mold cavity and the second mold members pivoted to the closed position.
Figure 3:
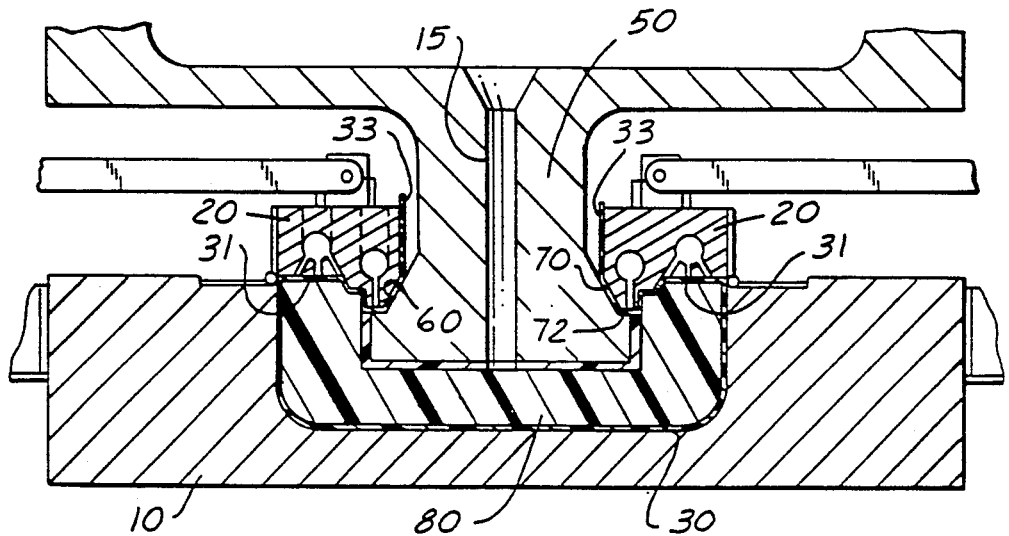
FIG. 3 is similar to FIG. 2 but showing polyurethane foam in the space between the plastisol skin and rigid insert.

Referring to FIGS. 1-3, the apparatus of the invention includes a first female mold member 10 having a surface 12 defining a mold cavity 14.

Disposed on the top surface 16 of female mold member along and adjacent opposite sides of mold cavity 14 are a pair of facing second mold members 20. Mold members 20 are hingedly or pivotally mounted on top surface 16 by hinges 22, 24 having respective hinge pins 22a, 24a defining a pivot axis for each hinge. Mold members 20 may be pivotally mounted on other mold components.

Figure 4:
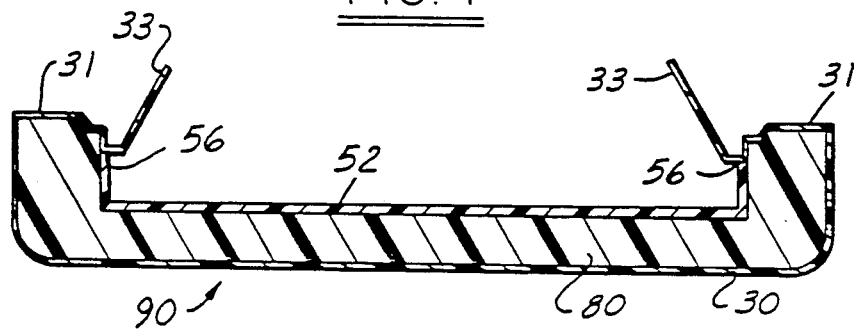
FIG. 4 is a sectional view of the molded foam article after removal from the apparatus of FIG. 3.
Figure 5:
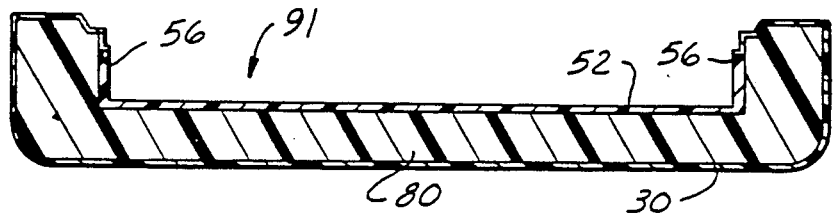
FIG. 5 is a sectional view of the molded foam article after excess skin is trimmed off.

In FIG. 1, the second mold members 20 are shown in the open position with a respective surface 26 generally contiguous with the adjacent surface 12 defining the mold cavity 14. As shown, a thin plastisol foam-impermeable skin 30, such as vinyl pplastisol, vinyl drysol, vinyl acrililnitryl butadyene styrene or other known foam impermeable material is received on surface 12 of the mold cavity. The skin 30 will ultimately form an outer decorative layer on the molded foamed article as shown in FIGS. 4-5. Portions 31 of the skin extend from the mold cavity 14 and are received on surfaces 26 of the second mold members as shown.

The female mold member 10 includes a plurality of passages 34 that are connected to a vacuum pump 35. Similarly, each of the second mold members 20 includes a plurality of passages 38 that are connected to the same or different vacuum pump 35. Suitable conduits 40, 42 shown schematically connect the passages 34, 38, respectively, to the vacuum pump 35.

After the plastisol skin 30 is positioned on surface 12 of the mold cavity and surfaces 26 of the second mold members 20, the vacuum pump 35 is activated to create a relative vacuum or low pressure in passages 34 and 38 and thus on the side of skin 30 adjacent surface 12 relative to ambient pressure on the opposite side of the skin 20 so as to vacuum form and hold the skin to the surface 12 and surfaces 26 so that the skin assumes the contour of surfaces 12 and 26. The skin 30 vacuumed formed against surfaces 12 and 26 is shown in FIG. 1.

Thereafter, the third mold member 50 in the form of a mold lid is moved from the position of FIG. 1 to the position shown in FIG. 2 to position in the mold cavity 14 a rigid foam-impermeable plastic support insert 52 held releasably in position on the mold lid by conventional spring loaded keeper assemblies (not shown) on the mold lid, the insert being spaced from the skin 30 when positioned in mold cavity 14 as shown. Support insert 52 may be made of styrene malic anhydride, NORYL, ABS, metal and the like and provides structural support in the molded foam article. The insert is generally rectangular in plan view. It is apparent that the mold lid 50 is moved toward the female mold member 12 while the second mold member 20 are in the open position.

FIG. 2, the insert 52 includes inner surfaces 54 that face skin 30 in the mold cavity 14. Insert 52 also includes a peripheral upper edge 56 facing the mold lid 50 and facing away from the surface 12 of the mold cavity and the skin 30 thereon.

Following positioning of the insert 52 in the mold cavity 14 as shown in FIG. 2, the second mold members 20 are each pivoted about the hinge pin pivot axis toward the mold lid 50 to the position shown in FIG. 2. It is apparent that pivoting of the second mold members 20 in this way folds the skin 30 adjacent the hinge pin pivot axis. Each skin portion 31 is folded between the female mold member and mold lid so as to extend laterally from the surface 12 of the mold cavity adjacent the hinge pin toward upper insert edge 56 and over and against upper edge 56 where each skin is held by the associated second mold member 20. Vacuum pump 35 is maintained activated during pivoting of the mold members 20 and also during foam injection as will be explained. Each folded portion 31 of the skin in FIG. 2 closes off the space between the insert 50 and skin on the surface 12 of the mold cavity to provide a confined space therebetween into which polyurethane foam can be injected as a foam or foamed in situ from a liquid polyurethane poured in the space.

Each mold member 20 maintains the associated skin portion 31 against the upper edge 56 of the insert 52 during foaming to minimize escape of foam between edge 56 and the skin thereon; i.e., each mold member 20 maintains the associated skin portion 31 in sealed relation to upper edge 56 to minimize or prevent foam escape.

Mold members 20 include locating surfaces 60, 62 that, as is apparent from FIG. 2, mate and locate in overlying relation with cooperative complementary locating surfaces 70, 72 on the mold lid 50.

Figure 6:
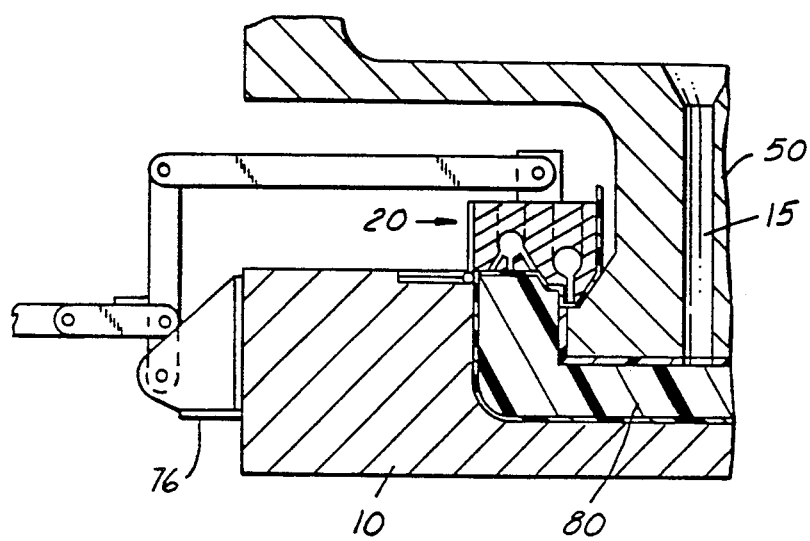
FIG. 6 is a partial sectional view similar to FIG. 2 showing toggle actuator 76.

Mold members 20 are pivoted from the open position of FIG. 1 to the closed position of FIG. 2 by any suitable actuator 76, such as a toggle action-hold down type of actuator (FIG. 6), that can be controlled automatically by a control unit (not shown) that can also control movement of mold lid 50 and other functions of the molding apparatus. Only one actuator 76 is shown in FIG. 2. A like actuator would be used to pivot the other mold member 20 in FIG. 2. The control unit would effect movement of mold lid 50 and mold members 20 in proper sequence as described above to provide the mold assembly shown in FIG. 2.

The control unit can also acturate a foam injection device (not shown) of conventional type to inject polyurethane foam 80 through injection port 15 in the mold lid 50 into the space between the skin 30, 31 and insert 52 as shown in FIG. 3. Insert 52 includes an oppening in registry with port 15 to this end. Vacuum pump 35 maintains plastisol layer of skin 30 vacuum formed against surface 12 of the mold cavity and skin portions 31 against associated mold members 20 during foam injection.

As is known, the foam is cured in the mold assembly of FIG. 3 by heating the foam to a cure temperature. The foam can be heated by providing suitable passages (not shown) in the female mold member 12 to receive a heating fluid, all as is well known.

Curing of the polyurethane foam 80 forms a composite molded foam article 90, FIG. 4, comprising an outer decorative skin 30, inner rigid insert 52 held together by intermediate foam cured therebetween with skin portions 31 held in position on insert edge 56 by the cured foam 80. As is apparent, each skin portion 31 includes an excess portion 33 projecting beyond the molded article 90. As shown in FIG. 5, this excess portion 33 is trimmed off the molded article 90 to provide a finished molded article 91 having no excess skin. As a result of the sealing action of skin portion 31 against upper edge 56 of the insert, foam burrs and related defects caused by escape of foam from the space between the skin and insert are minimized or eliminated on the molded article 90.

The molded article 90 is removed from the mold assembly of FIG. 3 by first deactivating vacuum pump 35 to release skin 30 from the mold cavity and skin portions 31 from surfaces 26 and then pivoting the mold members 20 from the closed position to the open position of FIG. 1 using actuators 76. Then, the mold lid 50 is withdrawn from the mold cavity 14 after releasing the insert 50 from the mold lid by turning the spring loaded keeper assemblies on the mold lid. The molded article 90 can then be removed or demolded from mold cavity 14. Manual actuation or suitable mechanical or pneumatic actuator means can be used to move the mold lid 50 through the above-described sequence of motions.

FIGS. 1-3 illustrate the female mold member 12 having the second mold members 20 pivotally mounted on opposite sides of the mold cavity 14. Similar mold members can be mounted adjacent the opposite ends of the mold cavity 14 to function in a similar manner as described hereinabove for the mold members 20 to wrap the plastisol skin over the edge of the insert adjacent the opposite ends of the mold cavity 14.

Although the invention has been illustrated with respect to the apparatus and method for making a molded article having a plastisol skin and rigid insert with polyurethane foam formed therebetween, it will be apparent that other materials may be used to make the composite molded article. Other materials which could be used in lieu of polyurethane include but are not limited to reaction injection molded type nylon, styrene, polyester, olefin as well as others.

Furthermore, although vacuum holding of skin portion 31 on the second mold members 20 has been illustrated as preferred, other means for holding the skin portion 31 on mold members 20 may be used so long as the skin portion 31 can be released from mold members 20 after the article 90 is formed.

In addition, although skin portion 31 shown folded over and onto the upper peripheral edge 56 of insert 50, the skin portion may be folded to engage against other portions of insert 52 or against components such as a film or other layer attached to the insert 50.

And, while certain specific and preferred embodiments of the invention have been described in detail hereinabove, those skilled in the art will recognize that various modifications and changes can be made therein within the scope of the appended claims which are intended to include equivalents of such embodiments.

We claim:

1. A method for making a molded foam article comprising:
   (a) positioning a layer on a surface defining a mold cavity with portions of the layer extending from the mold cavity,
   (b) holding said portions of the layer support surfaces of movable members that are oriented in an open position with said support surfaces generally contiguous with the surface of said mold cavity,
   (c) positioning an insert in the mold cavity with the movable members in an open position and with the insert spaced from the layer, the insert being positioned with an upper edge facing away from the layer in the mold cavity,
   (d) pivoting the movable members to a closed position toward the insert after the insert is positioned in the mold cavity to move and fold said portions of the layer against said upper edge of the insert while said layer remains positioned in the mold cavity to seal said portions against said upper edge, and
   (e) then introducing foam between the layer and insert to unite the layer and the insert together.

2. The method of claim 1 further including holding the layer on the surface defining the mold cavity during step (d).

3. The method of claim 2 wherein step (d) includes establishing a differential pressure on opposite sides of the layer to hold it on the surface.

4. The method of claim 1 wherein step (b) includes holding said portion of the layer on the movable member by establishing a differential pressure on opposite sides of said portion.

5. The method of claim 1 wherein the movable member is pivoted toward the insert in step (d) about a pivot axis adjacent a side of the mold cavity and the layer is folded generally about the pivot axis.

* * * * *

UNITED STATES PATENT AND TRADEMARK OFFICE
CERTIFICATE OF CORRECTION

PATENT NO. : 4,863,654

DATED : September 5, 1989

INVENTOR(S) : Ernest L. Belleville and Patricia A. Betzig

It is certified that error appears in the above-identified patent and that said Letters Patent is hereby corrected as shown below:

```
Column 1, line 40, delete "raking" and insert --making--
          therefor.
Column 1, line 58, delete "foam" and insert --form--
          therefor.
Column 2, line 19, delete "molded" and insert --mold--
          therefor.
Column 2, line 24, delete "of" and insert --,-- therefor.
Column 3, line 8, after "member" insert --10--.
Column 3, line 19, delete "pplastisol" and insert
          --plastisol-- therefor.
Column 3, line 22, after "cavity" insert --14--.
Column 3, line 26, after "members" insert --20--.
Column 3, line 35, after "cavity" insert --14--.
Column 3, line 40, delete "20" and insert --30--.
Column 3, line 41, after "skin" insert --30--.
Column 3, line 48, after "mold lid" insert --50--.
Column 3, line 50, after "mold lid" insert --50--.
Column 3, line 50, after "insert" insert --52--.
Column 3, line 54, after "insert" insert --52--.
Column 3, line 62, after "cavity" insert --14--.
Column 4, line 3, after "member" insert --10--.
Column 4, line 3, after "lid" insert --50--.
Column 4, line 4, after "cavity" insert --14--.
Column 4, line 10, after "skin" insert --30--.
Column 4, line 11, after "skin" insert --30--.
Column 4, line 12, after "cavity" insert --14--.
Column 4, line 46, after "cavity" insert --14--.
Column 4, line 65, after "insert" insert --52--.
Column 4, line 66, after "skin" insert --30--.
```

UNITED STATES PATENT AND TRADEMARK OFFICE
CERTIFICATE OF CORRECTION

PATENT NO. : 4,863,654

DATED : September 5, 1989

INVENTOR(S) : Ernest L. Belleville and Patricia A. Betzig

It is certified that error appears in the above-identified patent and that said Letters Patent is hereby corrected as shown below:

Column 4, line 67, after "insert" insert --52--.

Column 5, line 8, after "insert" delete "50" and insert --52--.
Column 5, line 8, after "lid" insert --50--.
Column 5, line 9, after "lid" insert --50--.
Column 5, line 20, after "skin" insert --30--.
Column 5, line 20, after "insert" insert --52--.
Column 5, line 39, after "portion" insert --31--.
Column 5, line 41, delete "50" and insert --52-- therefor.

Signed and Sealed this

Twelfth Day of October, 1993

Attest:

BRUCE LEHMAN

Attesting Officer

Commissioner of Patents and Trademarks